United States Patent
Li

(10) Patent No.: US 12,427,416 B2
(45) Date of Patent: Sep. 30, 2025

(54) METHOD FOR INTERACTION IN GAME, DEVICE, AND NON-TRANSITORY COMPUTER-READABLE STORAGE MEDIUM

(71) Applicant: NETEASE (HANGZHOU) NETWORK CO., LTD., Zhejiang (CN)

(72) Inventor: Guang Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 31 days.

(21) Appl. No.: 18/042,607

(22) PCT Filed: Feb. 24, 2022

(86) PCT No.: PCT/CN2022/077569
§ 371 (c)(1),
(2) Date: Feb. 23, 2023

(87) PCT Pub. No.: WO2022/242260
PCT Pub. Date: Nov. 24, 2022

(65) Prior Publication Data
US 2024/0269556 A1    Aug. 15, 2024

(30) Foreign Application Priority Data
May 18, 2021  (CN) .......................... 202110542944.1

(51) Int. Cl.
*A63F 13/537* (2014.01)
(52) U.S. Cl.
CPC .................................. *A63F 13/537* (2014.09)
(58) Field of Classification Search
CPC .. A63F 13/5375; A63F 13/537; A63F 13/833; A63F 13/5372
See application file for complete search history.

(56) References Cited

U.S. PATENT DOCUMENTS

| | | | |
|---|---|---|---|
| 7,086,005 B1* | 8/2006 | Matsuda | H04M 7/003 715/706 |
| 7,979,574 B2* | 7/2011 | Gillo | A63F 13/34 709/203 |
| 2004/0032082 A1* | 2/2004 | Vincent | A63F 9/18 273/254 |
| 2008/0061502 A1 | 3/2008 | Cunliffe et al. | |

(Continued)

FOREIGN PATENT DOCUMENTS

| CN | 107335219 A | 11/2017 |
|---|---|---|
| CN | 108465238 A | 8/2018 |

(Continued)

OTHER PUBLICATIONS

TapGameplay, Among US—Gameplay Walkthrough (iOS, Android), Apr. 27, 2020, pp. 1-13, Youtube.com, at https://www.youtube.com/watch?v=y8sSIGon3Yc (last visited Feb. 13, 2025). (Year: 2020).*

(Continued)

*Primary Examiner* — Steve Rowland
(74) *Attorney, Agent, or Firm* — Qinghong Xu

(57) ABSTRACT

A method for interaction in a game includes: in response to a preset trigger event, controlling a scene displayed in the graphic user interface to change from a first virtual scene to a second virtual scene of the discussion stage; displaying at least one interaction icon by the graphical user interface; in response to a trigger operation in the at least one interaction icon, controlling a first virtual object model to perform an animation corresponding to the interaction icon corresponding to the trigger operation to a target virtual object model, where the target virtual object model is a model in at least one second virtual object model.

18 Claims, 10 Drawing Sheets

(56) References Cited

U.S. PATENT DOCUMENTS

| | | | | |
|---|---|---|---|---|
| 2008/0184122 | A1* | 7/2008 | Grant | G06Q 10/10 |
| | | | | 715/723 |
| 2009/0253513 | A1* | 10/2009 | Ducheneaut | A63F 13/87 |
| | | | | 463/42 |
| 2011/0201426 | A1* | 8/2011 | Fujimoto | A63F 13/00 |
| | | | | 463/31 |
| 2012/0270578 | A1* | 10/2012 | Feghali | H04W 4/14 |
| | | | | 455/466 |
| 2014/0364211 | A1* | 12/2014 | Masuda | A63F 13/00 |
| | | | | 463/31 |
| 2015/0045123 | A1 | 2/2015 | Fisher et al. | |
| 2015/0172599 | A1* | 6/2015 | Caldwell | H04N 7/157 |
| | | | | 348/14.03 |
| 2022/0143513 | A1* | 5/2022 | Carroll | A63F 9/18 |

FOREIGN PATENT DOCUMENTS

| | | |
|---|---|---|
| CN | 110177041 A | 8/2019 |
| CN | 110339570 A | 10/2019 |
| CN | 110850983 A | 2/2020 |
| CN | 111672099 A | 9/2020 |
| CN | 112156455 A | 1/2021 |
| CN | 112675526 A | 4/2021 |
| CN | 113262481 A | 8/2021 |
| WO | 2020238592 A1 | 12/2020 |
| WO | 2020253685 A1 | 12/2020 |

OTHER PUBLICATIONS

International Search Report dated May 24, 2022 of International Application No. PCT/CN2022/077569.

1st Office Action dated Nov. 22, 2023 for Chinese Application No. 202110542944.1.

MuziL, [werewolf kill] four consecutive wolves do not jump ahead, the good card can point out four wolves? https://www.bilibili.com/video/BV1VD4y1d7NM/?spm_id_from=333.788.videocard.5, Oct. 15, 2020.

* cited by examiner

METHOD FOR INTERACTION IN GAME, DEVICE, AND NON-TRANSITORY COMPUTER-READABLE STORAGE MEDIUM

CROSS REFERENCE

The present application is a National Stage of International Application No. PCT/CN2022/077569 filed on Feb. 24, 2022, which claims priority to Chinese Patent Application No. 202110542944.1 entitled "Method for interaction in game, apparatus, device and storage medium", filed on May 18, 2021, and the entire contents of which are incorporated herein by reference.

TECHNICAL FIELD

The present disclosure relates to the technical field of games, and in particular, to a method for interaction in game, an apparatus, a device and a storage medium.

BACKGROUND

With the development of the Internet field, games can be seen everywhere in people's lives, and have become a variety of entertainment channels for people's leisure time. Among many games, multiplayer online reasoning games are more popular games now.

Most reasoning games can be divided into two links, namely the action link and the voting link. All surviving players in the action link can act, for example, civilian players can do tasks, werewolves can make trouble, do tasks or kill people, etc. In the voting link, players can vote based on the observation of the action link and the speeches of other players in the voting link and identify werewolves based on voting results.

It should be noted that the information disclosed in the background section above is only used to enhance the understanding of the background of the present disclosure, and thus may include information that does not constitute related art known to those of ordinary skills in the art.

SUMMARY

According to some embodiments, there is provided a method for interaction in a game according to embodiments of the present disclosure, a graphical user interface is provided by a terminal, the graphical user interface includes a virtual scene of a current round stage, the round stage includes an action stage and a discussion stage, and the method includes:
  displaying, in the action stage, a first virtual scene of the action stage by the graphical user interface; controlling, in response to a movement operation for a first virtual object, the first virtual object to move in the first virtual scene of virtual environment; and controlling a range image of the first virtual scene of the virtual environment displayed in the graphical user interface to change correspondingly according to movement of the first virtual object;
  controlling, in response to a preset trigger event, a scene displayed by the graphical user interface to change from the first virtual scene to a second virtual scene in the discussion stage, where the second virtual scene includes a first virtual object model and at least one second virtual object model;
  displaying at least one interaction icon by the graphical user interface;
  controlling, in response to a trigger operation in the at least one interaction icon, the first virtual object model to perform an animation corresponding to the interaction icon corresponding to the trigger operation to the target virtual object model, where the target virtual object model is a model in the at least one second virtual object model.

According to some embodiments of the present disclosure, there is provided a device for interaction in a game according to embodiments of the present disclosure, including a processor, a storage medium and a bus, where the storage medium stores with a machine-readable instruction executable by the processor, when the device for interaction in the game runs, the processor communicates with the storage medium through the bus, and the processor executes the machine-readable instruction to perform steps of the method according to some embodiments of the present disclosure.

According to some embodiments of the present disclosure, there is provided a non-transitory computer-readable storage medium, storing with a computer program, when the computer program is run by a processor, steps of the method according to some embodiments the present disclosure are performed.

It is to be understood that both the foregoing general description and the following detailed description are exemplary and explanatory only and are not restrictive of the present disclosure.

BRIEF DESCRIPTION OF THE DRAWINGS

In order to illustrate the technical solutions of the embodiments of the present disclosure more clearly, the accompanying drawings used in the embodiments will be briefly introduced in the following. It should be understood that the following drawings only show some embodiments of the present disclosure, and therefore should not be regarded as a limitation on the scope. Those skilled in the art can also obtain other related drawings based on these drawings without creative work.

DETAILED DESCRIPTION

Figure 1:
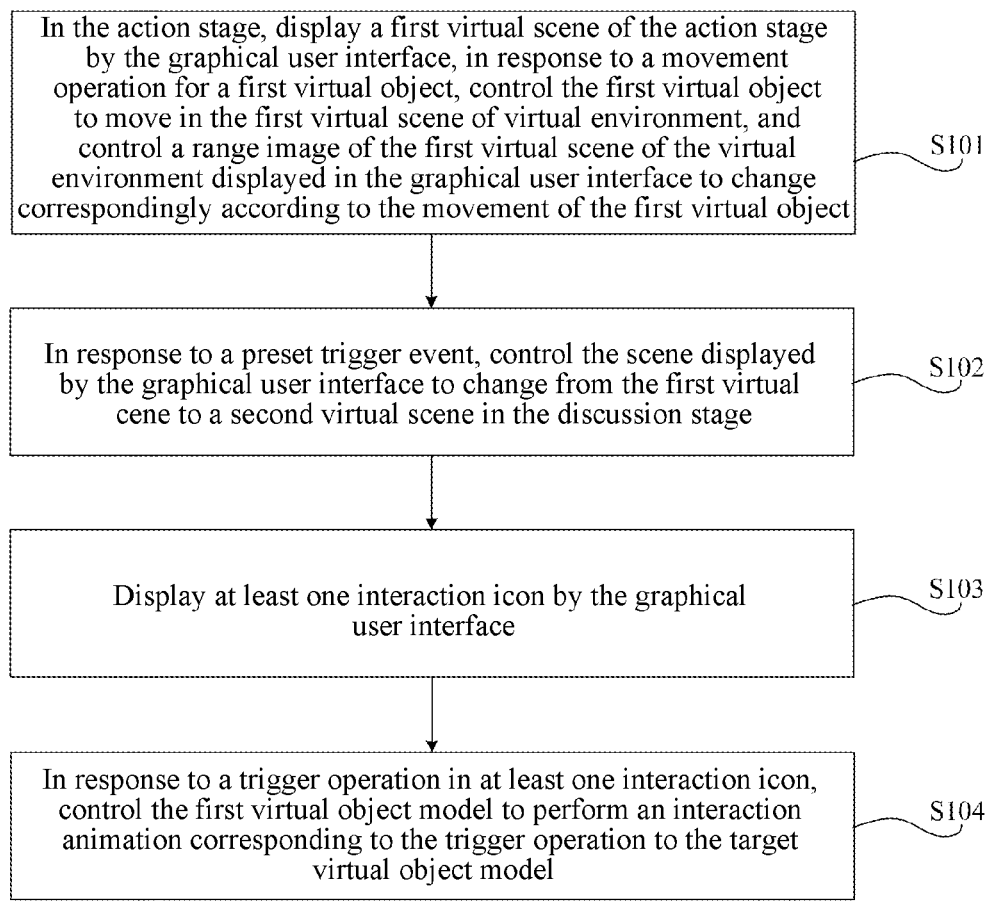
FIG. 1 is a schematic flowchart of a method for interaction in a game provided by an embodiment of the present disclosure.

In order to make the object, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some embodiments of the present disclosure, not all embodiments.

The components of the disclosed embodiments generally described and illustrated in the drawings here may be arranged and designed in a variety of different configurations. Accordingly, the following detailed description of the embodiments of the present disclosure provided in the accompanying drawings is not intended to limit the scope of the present disclosure to be protected, but merely represents selected embodiments of the present disclosure. Based on the embodiments of the present disclosure above, all other embodiments obtained by those skilled in the art without creative effort shall fall within the protection scope of the present disclosure.

Additionally, the flowcharts used in the present disclosure illustrate operations implemented in accordance with some embodiments of the disclosure. It should be understood that the operations of the flowcharts may be performed out of order, and steps that have no logical context may be performed in reverse order or concurrently. In addition, those skilled in the art may add one or more other operations to the flowchart, or remove one or more operations from the flowchart under the guidance of the present disclosure.

The following content is an explanation of some terms involved in the present disclosure.

Virtual scene: it is a virtual scene displayed (or provided) when an application program is running on a terminal or a server. Optionally, the virtual scene is a simulation environment of the real world, or a half-simulation and half-fictional virtual environment, or a purely fictitious virtual environment. The virtual scene is any one of a two-dimensional virtual scene and a three-dimensional virtual scene, and the virtual environment may be sky, land, ocean, etc., where the land includes environmental element such as desert and city. Among them, the virtual scene is a scene of complete game logic of a virtual object such as user control.

Virtual object: it refers to a dynamic object that can be controlled in a virtual scene. Optionally, the dynamic object may be a virtual character, a virtual animal, an anime character, or the like. The virtual object is a character controlled by a player through an input device, or an artificial intelligence (AI) set in a virtual environment battle through training, or a non-player character (NPC) set in a virtual scene battle. Optionally, the virtual object is a virtual character competing in a virtual scene. Optionally, the number of virtual objects in the virtual scene battle is preset, or dynamically determined according to the number of clients joining the battle, which is not limited in the embodiments of the present disclosure. In a possible implementation, the user can control the virtual object to move in the virtual scene, for example, control the virtual object to run, jump, crawl, etc., and can also control the virtual object to fight with other virtual objects using the skills and virtual props provided by the application.

Player character: it refers to a virtual object that can be manipulated by a player to conduct activities in the game environment. It can also be called as a Shikigami character or a hero character in some electronic games. The player character can be at least one of different forms such as virtual characters, virtual animals, anime characters, and virtual vehicles.

Game interface: it refers to an interface corresponding to an application provided or displayed through a graphical user interface, and the interface includes a UI interface and a game screen for players to interact with each other. In an optional embodiment, the UI interface may include a game control (such as a skill control, a movement control, a function control, etc.), an indicating identification (such as a direction indicating identification, a character indicating identification, etc.), an information display area (such as, number of people killed, game time, etc.), or a game setting control (e.g., system setting, store, golden coin, etc.). In an optional embodiment, the game screen is a display screen corresponding to the virtual scene displayed by a terminal device, and the game screen may include virtual objects such as game characters. NPC characters, and AI characters that perform game logic in the virtual scene.

Virtual body: it refers to a static object in the virtual scene, such as terrain, a house, a bridge, vegetation, etc. in the virtual scene. The static object is often not directly controlled by the player, but can respond to the interaction behavior (such as attacking, demolishing, etc.) of the virtual object in the scene, and conduct corresponding performance. For example, the virtual object can perform demolishing, picking up, dragging, constructing etc. to a building. Optionally, the virtual body may not be able to respond to the interaction behavior of the virtual object. For example, the virtual body may also be a building, door, window, plant, etc. in the virtual scene, but the virtual object cannot interact with it. For example, the virtual object is n not able to damage or remove a window.

The method for interaction in a game in one embodiment of the present disclosure can run on a terminal device or a server, where the terminal device may be a local terminal device. When the method for interaction in the game runs on the server, it can be realized and executed based on a cloud interaction system, where the cloud interaction system includes a server and a client device.

In an optional implementation manner, various cloud applications, such as cloud games, can be run under the cloud interaction system. Taking a cloud game as an example, the cloud game refers to a game manner based on cloud computing. Under the operation mode of the cloud game, the main body for running the game program and the main body for presenting the game screen are separated, the storage and operation of the information processing method are completed on the cloud game server, and the function of the client device is to receive and send data and present the game screen. For example, the client device can be a display device with data transmission function close to the user side, such as a mobile terminal, a TV, a computer, a palmtop computer, etc.; but the terminal device for information processing is a cloud game server on the cloud. When playing a game, the player operates the client device to send an operation instruction to the cloud game server, and the cloud game server runs the game according to the operation instruction, encodes and compresses the date such as the game screen etc., returns it to the client device through the network, and finally decodes and output the game screen through the client device.

In an optional implementation manner, the terminal device may be a local terminal device. Taking a game as an example, the local terminal device stores with a game program and is used to present a game screen. The local terminal device is used to interact with the player through the graphical user interface, that is, to download and install the game program and run it through an electronic device conventionally. The local terminal device may provide the graphical user interface to the player in various manners, for example, rendering and displaying it on the display screen of the terminal, or providing it to the player through holographic projection. For example, the local terminal device may include a display screen and a processor, the display screen is used to present a graphical user interface, the graphical user interface includes a game screen, and the processor is used to run the game, generate a graphical user interface, and control the display of the graphical user interface on the display screen.

The method provided by the present disclosure can be applied, for example, to a reasoning virtual scene. In a reasoning game, more than one player participating in the game join a same game round. After entering the game round, the virtual objects of different players are assigned with different character attributes, such as identity attributes, different camps are determined by assigning different character attributes, so that players can win the game by performing tasks assigned by the game at different round stages of the game round, for example, more than one virtual object can win the game with character attribute A by "eliminating" the virtual objects with character attribute B the in the round stage. Taking a reasoning game as an example, it usually requires 10 people to participate in the same game round. At the beginning of the game round, the identity information (character attribute) of the virtual objects in the game round is determined. For example, the identity information includes civilian identity and Werewolf identity, the virtual object with civilian identity wins the game by completing the assigned specific tasks in the round stage, or by eliminating the virtual objects with werewolf identity in the current game round; the virtual object with werewolf identity wins the game in the round stage, by performing attack behavior to other virtual objects that are not werewolf identities to eliminate the virtual objects.

In the round stage of a reasoning game, there are usually two round stages: the action stage and the discussion stage.

During the action stage, one or more game tasks are usually assigned. In an optional embodiment, each virtual object is assigned with one or more corresponding game tasks, and the player completes the game round by controlling the corresponding virtual object to move in the virtual scene and execute the corresponding game tasks. In an optional embodiment, a common game task will be determined for the virtual objects with a same character attribute in the current game round. In the action stage, the virtual objects participating in the current game round can move freely in the virtual scene of the action stage to different areas in the virtual scene, so as to complete the assigned game tasks, where the virtual objects in the current game round include a virtual object with a first character attribute and a virtual object with a second character attribute. In an optional embodiment, when the virtual object with the second character attribute moves to the preset range of the virtual object with the first character attribute in the virtual scene, it can respond to an attack instruction and attack the virtual object with the first character attribute, so as to eliminate the virtual object with the first character attribute.

In the discussion stage, a discussion function is provided for the virtual object representing the player, and the behavior of the virtual object in the action stage is displayed through the discussion function, so as to decide whether to eliminate a specific virtual object in the current game round.

Taking a reasoning game as an example, the game round includes two stages, namely the action stage and the discussion stage. In the action stage, more than one virtual object in the game round moves freely in the virtual scene, and other virtual objects that appear within the preset range can be seen in the game screen displayed through the virtual object perspective. A virtual object with a civilian identity moves in the virtual scene to complete the assigned game tasks, a virtual object with a werewolf identity destroys the completed tasks of a virtual object with a civilian identity in the virtual scene, or can perform a specific assigned game. At the same time, the virtual object with the werewolf identity can also attack the virtual object with the civilian identity in the action stage to eliminate the virtual object. When the game round stage enters the discussion stage from the action stage, the players discuss through the corresponding virtual objects in an attempt to determine the virtual object with werewolf identity according to the game behavior in the action stage, determine the discussion result by voting, and determine whether there is a virtual object that needs to be eliminated according to the discussion result. If yes, the corresponding virtual object is eliminated according to the discussion result. If not, there is no virtual object that needs to be eliminated in the current discussion stage. Among them, in the discussion stage, the discussion may be carried out by voice, text, or other methods. However, in the related art, during the speaking process of one player, other players are prohibited from speaking during the voting process, resulting in the restriction of interaction of other players during the speaking process of one player.

The method for interaction in a game provided by the embodiments of the present disclosure is explained below in combination with several specific application examples. FIG. 1 is a schematic flow diagram of a method for interaction in a game provided by an embodiment of the present disclosure. A graphical user interface is provided through a terminal, and the graphical user interface includes a virtual scene of the current round stage, and the round stage includes an action stage and a discussion stage. As shown in FIG. 1, the method includes:

In S101, in the action stage, a first virtual scene of the action stage is displayed by the graphical user interface, the first virtual object is controlled to move in the first virtual scene of virtual environment in response to a movement operation for a first virtual object, and a range image of the first virtual scene of the virtual environment displayed in the graphical user interface is controlled to change correspondingly according to the movement of the first virtual object.

In an embodiment of the present disclosure, the graphical user interface in the action stage includes at least part of the first virtual scene in the action stage and a first virtual object model located in the first virtual scene; where, the first virtual object model is the virtual object manipulated correspondingly by the player of the current terminal device. Of course, there may be other virtual object models in the first virtual scene, which is not limited here.

In an embodiment of the present disclosure, in the action stage, players of different camps correspond to different tasks, and players of each camp operate their own virtual object models to perform tasks in the current virtual scene according to their own tasks.

In S102, in response to a preset trigger event, the scene displayed by the graphical user interface is controlled to change from the first virtual scene to a second virtual scene in the discussion stage.

Among them, the trigger event is, for example, a virtual object initiating a discussion, or the action stage ending, etc., which is not limited here. After the triggering event occurs, the virtual scene or switch to the scene corresponding to the discussion stage.

Figure 2:
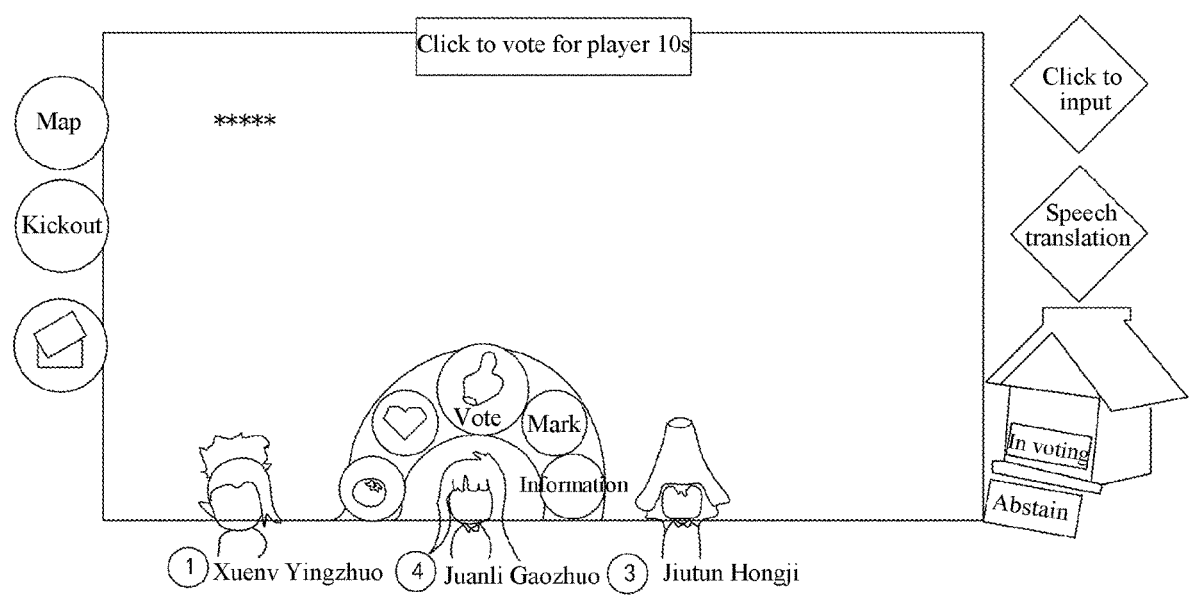
FIG. 2 is a schematic diagram of a graphical user interface of a second virtual scene provided by another embodiment of the present disclosure.

FIG. 2 is a schematic diagram of a graphical user interface of a second virtual scene provided by an embodiment of the present disclosure. The second virtual scene includes a first virtual object model and at least one second virtual object model. As shown in FIG. 2, each virtual object in the virtual object display interface can be sequentially displayed in a preset virtual object display interface according to the serial number of each virtual object, and a discussion display interface and a virtual object display interface can also be displayed on the graphical user interface, where the discussion display interface is used to display the current discussion progress, for example, it can display that "4 Juanli Gaozhuo initiated an urgent discussion", for example, it can also display the vote type of each vote, that is, displaying the voting information of each virtual object, and players can analyze the identity of each virtual object from the voting information of each virtual object. In addition, voting prompt information can also be displayed on the top of the discussion display interface, which is used to prompt players how to vote and the remaining voting time in the current voting link. During the voting link, each player can click on icons of other virtual objects other than the first virtual object corresponding to himself, the clicked virtual object is the player's voting object, and the player can also click an abstaining control in the game display interface to abandon the vote.

In S103, at least one interaction icon is displayed by the graphical user interface.

In an embodiment of the present disclosure, at least one interaction icon may be displayed at a preset position in the graphical user interface, where, the display manner may be, for example, displaying an abbreviated interaction icon control in the graphical user interface and displaying at least one interaction icon of normal size in response to a click operation for the abbreviated interaction icon control on the terminal by the game player corresponding to the virtual object; or the display manner can also be displaying each interaction icon in the form of a skill control at a preset position in the graphical user interface.

In another embodiment of the present disclosure, the display manner of the interaction icon may also be to determine the target virtual object model in response to a selection operation for at least one second virtual object model in the second virtual scene, and display at least one interaction icon corresponding to the target virtual object model. Where, in some possible embodiments, for example, it may be to display at least one interaction icon corresponding to the target virtual object model within the preset range of the target virtual object model, in response to the selection operation for icon of the target virtual object model in the at least one second virtual object model in the graphical user interface. As shown in FIG. 2, the display manner of the first virtual object model in the graphical user interface is different from the display manner of other second virtual objects, for example, it may be that the display transparency of the first virtual object model is relatively higher. In addition, in the embodiment of the present disclosure, after the target virtual object is determined in response to the selection operation, at least one interaction icon can be set in a circle and displayed above the target virtual object, or at least one interaction icon and other icons for the target virtual object, such as a voting icon, a marker icon or an information icon, can be set in a circle and displayed, where the voting icon is used to mark the target virtual object model as a virtual object to be voted, and the target virtual object will be will voted to during the voting link; the mark icon is used to mark the identity information of the target virtual object, such as marking the target virtual object as a werewolf or a civilian; the information icon is used to view the personal information of the player corresponding to the target virtual object model. It should be understood that the above-mentioned embodiments are only as an example, the specific content of the icons set in a circle and displayed and the purpose of each icon can be flexibly adjusted according to the requirements of the user, and are not limited to those given in the above embodiments. In addition, the specific display manner and display position of the interaction icons can be flexibly adjusted according to the requirements of the user, and are not limited to those given in the above embodiments.

For example, in some possible embodiments, in response to a trigger operation in at least one interaction icon, it is determined that whether the state information of the target virtual object model is the same as the state information of the first virtual object model; the state information is used to indicate living state of the virtual object. If yes, then the first virtual object model is controlled to perform the animation corresponding to the interaction icon corresponding to the trigger operation to the target virtual object model. That is, before performing the animation corresponding to the interaction icon, the state information of the target virtual object model and the first virtual object model is judged firstly, and only when the state information is consistent, the animation corresponding to the interaction icon can be performed.

For example, in some other possible embodiments, when the first virtual object model determines the target virtual object model, the state information of the target virtual object model and the first virtual object model can be judged, and only in case that the state information is consistent, at least one interaction icon will be displayed, otherwise, at least one interaction icon being grayed out will be limited. In this display mode, each interaction icon can only be displayed and cannot be triggered; or in case that the status information is inconsistent, at least one interaction icon will not be displayed, that is, the target virtual object model cannot be selected in case that the state information is inconsistent.

Such a setting manner in the embodiment of the present disclosure makes it possible for virtual objects with living state of surviving to interact with each other, and virtual objects with living state of dead to interact with each other, and the interaction content in each living state can only be shared among the virtual objects in this living state, that is, the interaction between the dead virtual object and the surviving virtual object is independent of each other, thus avoiding the interaction between the dead virtual object and the surviving virtual object, which will result in the problem of affect the gaming experience of the player corresponding to the surviving virtual object.

In an embodiment of the present disclosure, the interaction icon may include, for example, an interaction icon meaning support and an interaction icon meaning opposition, where the interaction icon meaning support may be, for example, a heart icon, and the interaction icon meaning opposition may, for example, be a tomato icon. It should be understood that the above-mentioned embodiments are only exemplary illustrations. For example, the interaction icon for support may also be an upright thumb icon, that is, a "like" icon, and the interaction icon for opposition may also be an inverted thumb icon, that is, a "dislike" icon. The expression form of the interaction icon can be flexibly adjusted according to the user's requirements, and is not limited to the above-mentioned embodiments.

In S104, in response to a trigger operation in at least one interaction icon, the first virtual object model is controlled to perform an animation corresponding to the interaction icon corresponding to the trigger operation to the target virtual object model.

Among them, the target virtual object model is a model in at least one second virtual object model.

In one embodiment of the present disclosure, there is no cooling time for the triggering of the interaction icon, and there is no limit to the frequency of interaction, the interaction of opposite semantics is allowed to be replaced at any time, more than one virtual object is allowed to interact with each other, or more than one virtual object is allowed to interact with a same virtual object; and the triggering of the interaction icon can be used for all virtual objects, not limited to the virtual object being speaking.

Using the method for interaction in the game provided by the present disclosure, after the scene of the graphical user interface is controlled to change to the second virtual scene in response to a preset trigger event, at least one interaction icon can be displayed by the graphical user interface; and then in response to a trigger operation in at least one interaction icon, the first virtual object model is controlled to perform the animation corresponding to the interaction icon corresponding to the trigger operation to the target virtual object model, and the interaction between the first virtual object model and the target virtual object model is realized through the animation, thus realizing that in the second virtual scene, even if the first virtual object is not in the state of speaking, their attitude can be expressed at any time by the manner of selecting the interaction icon and the target virtual object model, or other players can be interacted with at any time, so that the problem that other players could not interact while one player was speaking is solved, improving the player's gaming experience.

Figure 3:
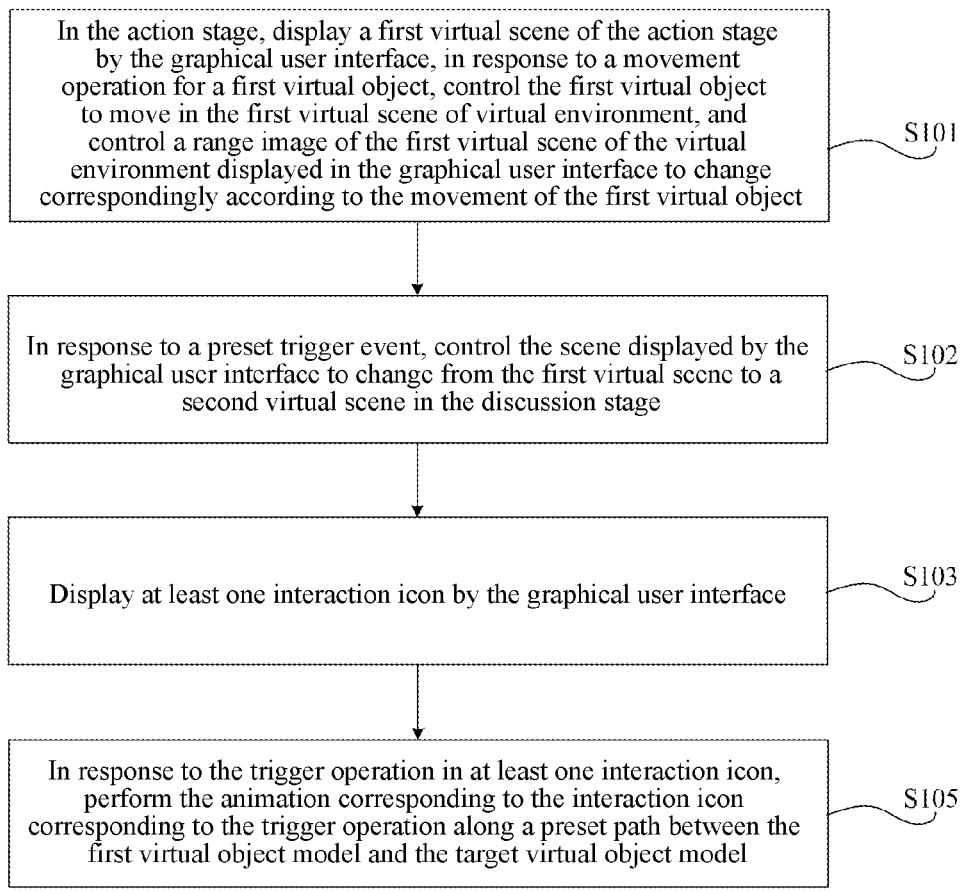
FIG. 3 is a schematic flowchart of a method for interaction in a game provided by another embodiment of the present disclosure.

Optionally, on the basis of the above-mentioned embodiments, the embodiments of the present disclosure can also provide a method for interaction in a game. The implementation process of performing the animation corresponding to the interaction icon corresponding to the trigger operation in the above-mentioned method is exemplarily illustrated as follows in conjunction with the accompanying drawings. FIG. 3 is a schematic flowchart of a method for interaction in a game provided by another embodiment of the present disclosure. As shown in FIG. 3, S104 may include:

In S105, in response to the trigger operation in at least one interaction icon, perform the animation corresponding to the interaction icon corresponding to the trigger operation along a preset path between the first virtual object model and the target virtual object model.

Exemplarily, in one embodiment of the present disclosure, for example, the first virtual object model may be taken as the playback start position of the animation, and the target virtual object model may be taken as the playback end position of the animation. According to the playback start position and the playback end position of the animation, the animation corresponding to the interaction icon corresponding to the trigger operation is performed along the preset path.

In some possible embodiments, in addition to the animation corresponding to the interaction icon, each virtual object may also have other display actions, for example, the model corresponding to the virtual object ready to speak may change from a sitting posture to a standing posture. In the process, a standing animation needs to be displayed, or each virtual object model may randomly display some pre-configured display animations in a sitting posture. Among them, different animations have different priorities. If the target virtual object model is performing an animation, it is determined that whether the priority of the animation being performing is higher than that of the animation corresponding to the interaction icon corresponding to the trigger operation; if so, the animation corresponding to the interaction icon corresponding to the trigger operation is performed after the animation being performed is completed; if not, the animation being performed is suspended, and the animation corresponding to the interaction icon corresponding to the trigger operation is performed; after the animation corresponding to the interaction icon corresponding to the trigger operation is performed completely, the animation being performed is continued to be performed.

In the embodiment of the present disclosure, among various types of animations, the priority of the speaking animation is the highest, followed by the priority of the interaction animation, and the priority of the animation randomly displayed in the sitting posture is the lowest. For example, if the target virtual object model is performing the speech animation, and at this time, there are an animation corresponding to the interaction icons initiated by another virtual object model to the target virtual object model, the target virtual object model will first perform the speech animation, and then perform the animation corresponding to the interaction icon initiated to another virtual object model to the target virtual object model after the speech animation is completed.

Figure 4:
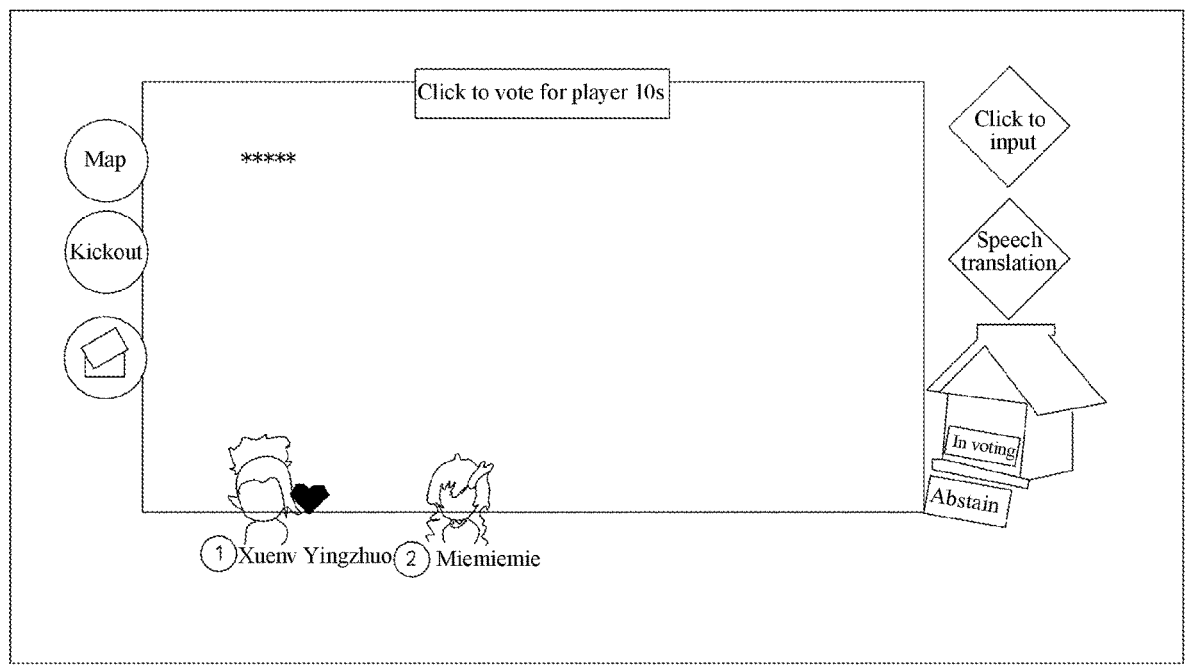
FIG. 4 is a schematic diagram of a graphical user interface of a second virtual scene provided by another embodiment of the present disclosure.
Figure 5:
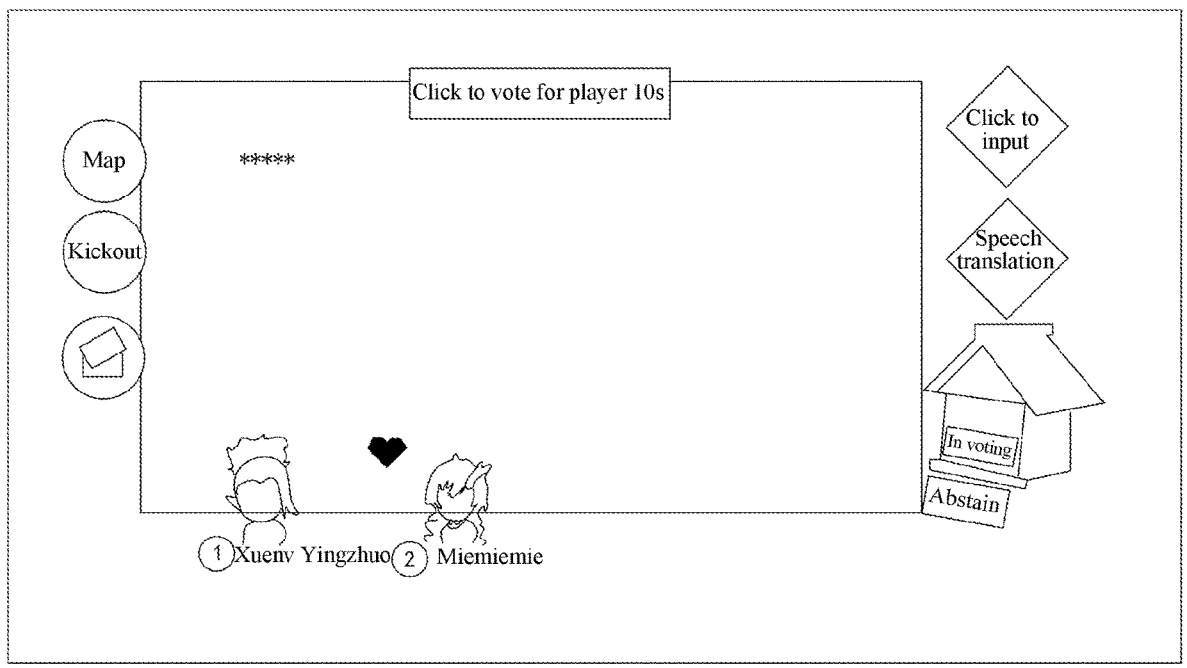
FIG. 5 is a schematic diagram of a graphical user interface of a second virtual scene provided by another embodiment of the present disclosure.
Figure 6:
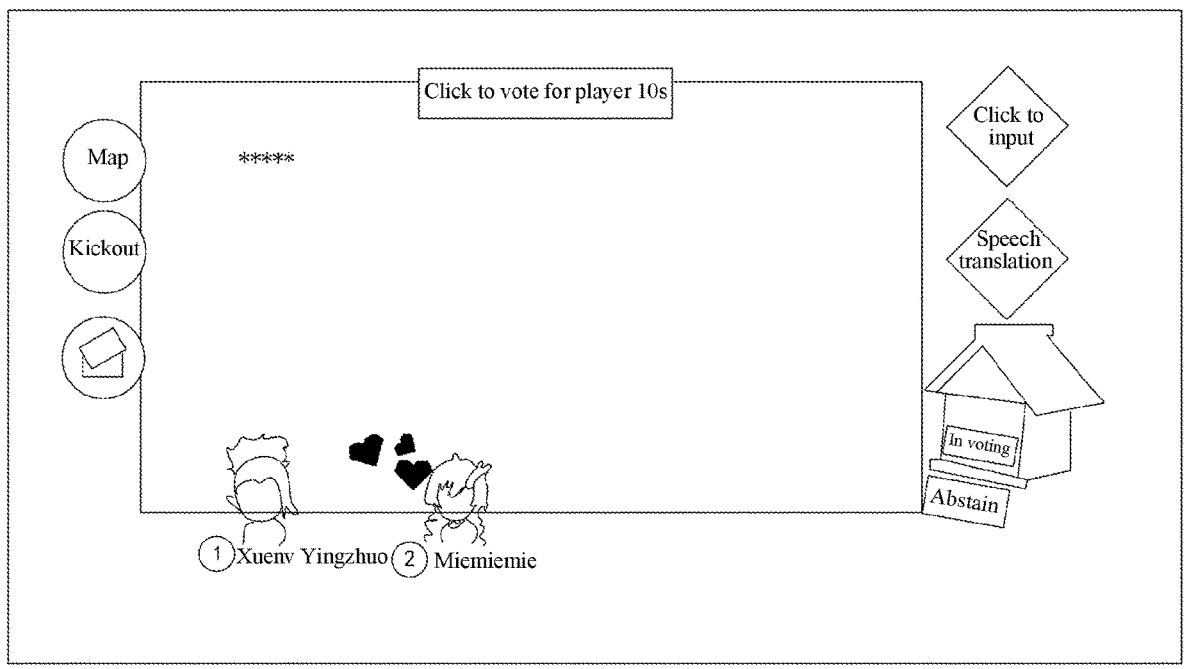
FIG. 6 is a schematic diagram of a graphical user interface of a second virtual scene provided by another embodiment of the present disclosure.

In some possible embodiments, the interaction icon corresponding to the trigger operation issued by the first virtual object model is displayed in the second virtual scene, and the interaction icon is controlled to move to the target virtual object model along a preset path, and it is displayed that the target virtual object model receives the interaction icon according to a preset action. FIG. 4 is a schematic diagram of a graphical user interface of a second virtual scene provided by another embodiment of the present disclosure, and FIG. 5 is a schematic diagram of a graphical user interface of a second virtual scene provided by another embodiment of the present disclosure, FIG. 6 is a schematic diagram of the graphical user interface of the second virtual scene provided by another embodiment of the present disclosure. As shown in FIGS. 4-6, at this time the virtual object model of Xuenv Yingzhuo triggers the interaction animation, the interaction animation is a heart icon, the target virtual object model receiving the interaction animation is the virtual object model of Miemiemie. Then the virtual object model of Xuenv Yingzhuo is taken as the playback start position of the animation, and virtual object model of Miemiemie is taken as the playback end position of the animation to control the virtual object model of Xuenv Yingzhuo to issue a heart icon according to the preset action, and the heart icon is controlled to move along the preset path from the virtual object model of Xuenv Yingzhuo to the virtual object model of Miemiemie, and it is displayed that the virtual object model of Miemiemie receives the heart icon according to the preset action until the performing of the heart interaction animation is completed.

For example, in some possible embodiments, if there is more than one interaction icon issued by different virtual object models to the target virtual object model, then it is sequentially displayed that the target virtual object model receives the interaction icon according to the initiation time of the more than one interaction icons.

Figure 7:
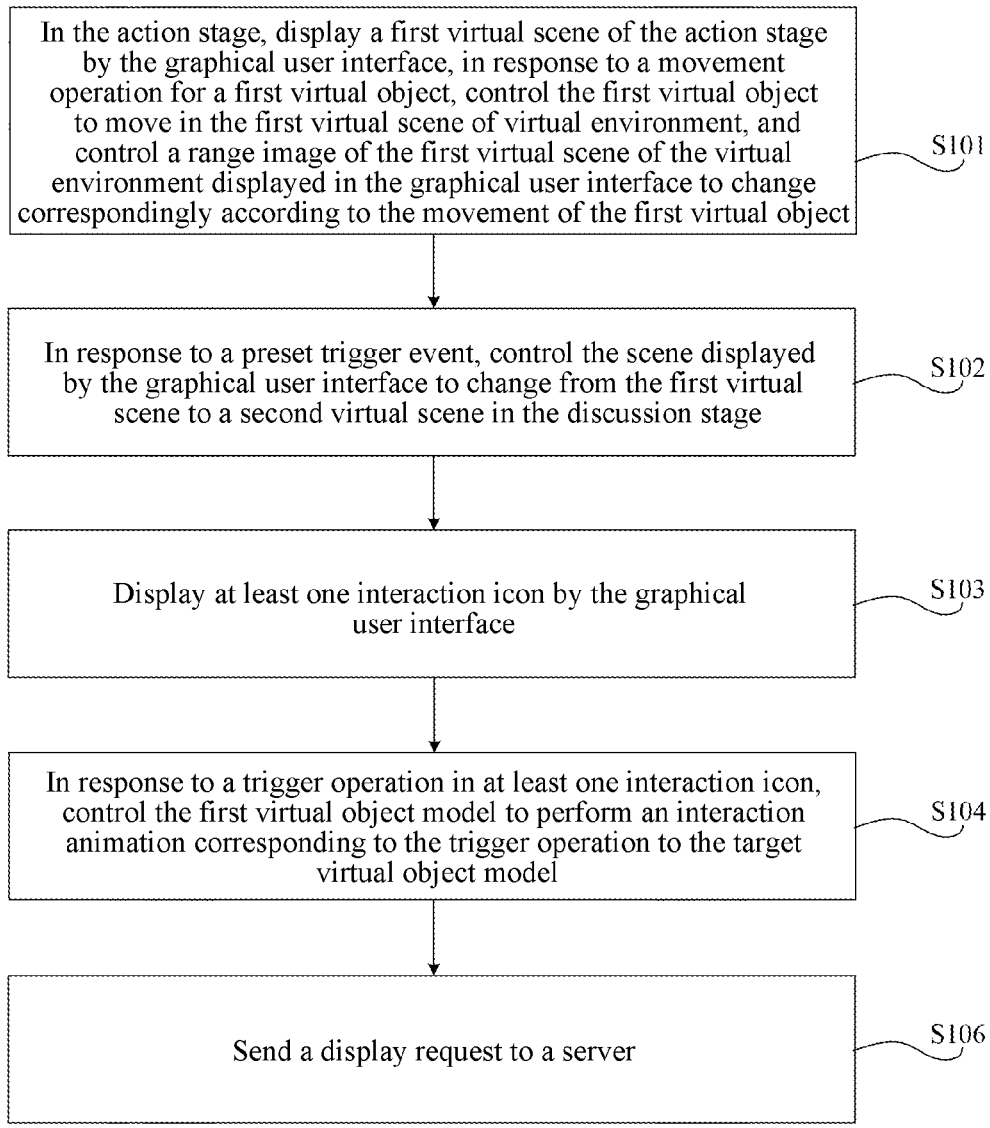
FIG. 7 is a schematic flowchart of a method for interaction in a game provided by another embodiment of the present disclosure.

Optionally, on the basis of the above-mentioned embodiments, the embodiments of the present disclosure may further provide a method for interaction in a game, and the implementation process of the above-mentioned method will be illustrated as follows with reference to the accompanying drawings. FIG. 7 is a schematic flowchart of a method for interaction in a game provided by another embodiment of the present disclosure. As shown in FIG. 7, after S104, the method may further include:

In S106, a display request is sent to a server.

Among them, the display request includes: an identification of the interaction icon corresponding to the trigger operation, an identification of the first virtual object model, and an identification of the target virtual object model. The display request is used to request the server to control a terminal of another visible virtual object model to display the animation corresponding to the interaction icon corresponding to the trigger operation.

Among them, another visible virtual object model includes: another virtual object models with same state information as the first virtual object model.

By using the method for interaction in the game provided by the present disclosure, one's emotions and opinions can be expressed at any time without interrupting the discussion during the discussion stage, and due to the convenience and speed of the interaction manner of the present disclosure, the threshold for interaction between virtual objects is greatly reduced, especially for game scenes that need to convey emotions such as detective or reasoning debates and analysis. Besides, the clear interaction rules and interaction games in the present disclosure ensure that only virtual objects with the same surviving state can interaction with each other, avoiding the problem of affecting the game experience of the players corresponding to the surviving virtual objects, and the number of interactions in the present disclosure is unlimited, which can fully help players release their emotions, at the same time, in the discussion requiring to take turns to speak, one's views can be expressed at any time without being limited by the order of speaking.

An apparatus for interaction in a game provided by the present disclosure will be explained below in conjunction with the accompanying drawings. The apparatus for interaction in the game can execute any method for interaction in the game in the above-mentioned FIGS. 1-7. For its specific implementation and beneficial effects, reference can be made to the above-mentioned, which will not be repeated below.

Figure 8:
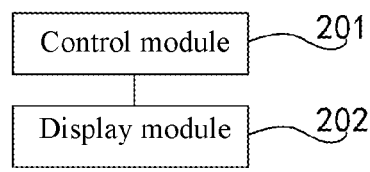
FIG. 8 is a schematic structural diagram of an apparatus for interaction in a game provided by an embodiment of the present disclosure.

FIG. 8 is a schematic structural diagram of an apparatus for interaction in a game provided by an embodiment of the present disclosure. A graphical user interface is provided by a terminal, and the graphical user interface includes a virtual scene of a current round stage, and the round stage includes an action stage and a discussion stage. As shown in FIG. 8, the apparatus includes: a control module 201 and a display module 202, where:

The control module 201 is configured to perform: in the action stage, displaying a first virtual scene of the action stage by the graphical user interface; in response to a movement operation for a first virtual object, controlling the first virtual object to move in the first virtual scene of virtual environment, and controlling a range image of the first virtual scene of the virtual environment displayed in the graphical user interface to change correspondingly according to movement of the first virtual object; and in response to a preset trigger event, controlling a scene displayed by the graphical user interface to change from the first virtual scene to a second virtual scene in the discussion stage, where the second virtual scene includes a first virtual object model and at least one second virtual object model;

The display module 202 is configured to perform displaying at least one interaction icon by the graphical user interface;

The control module 201 is configured to perform, in response to a trigger operation in the at least one interaction icon, controlling the first virtual object model to perform an animation corresponding to the interaction icon corresponding to the trigger operation to the target virtual object model, where the target virtual object model is a model in the at least one second virtual object model.

Optionally, the display module 202 is configured to perform, in response to a selection operation for the at least one second virtual object model in the second virtual scene, determining the target virtual object model, and displaying at least one interaction icon corresponding to the target virtual object model.

Optionally, the control module 201 is configured to perform, in response to the trigger operation in the at least one interaction icon, performing the animation corresponding to the interaction icon corresponding to the trigger operation along a preset path between the first virtual object model and the target virtual object model.

Optionally, the control module 201 is configured to perform the animation corresponding to the interaction icon corresponding to the trigger operation along the preset path according to a playback start position and a playback end position, where the first virtual object model is taken as the playback start position of the animation, and the target virtual object model is taken as the playback end position of the animation.

Figure 9:
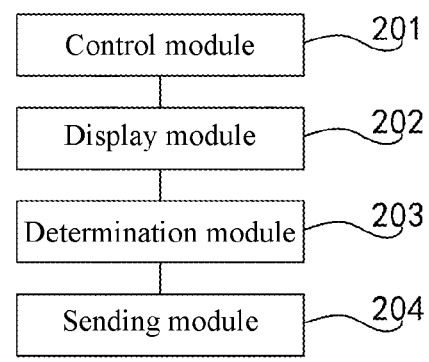
FIG. 9 is a schematic structural diagram of an apparatus for interaction in a game provided by another embodiment of the present disclosure.

Optionally, on the basis of the above-mentioned embodiments, the embodiments of the present disclosure may further provide an apparatus of interaction in a game, and the implementation process of the above-mentioned device will be described as an example in conjunction with the accompanying drawings as follows. FIG. 9 is a schematic structural diagram of an apparatus of interaction in a game provided by another embodiment of the present disclosure. As shown in FIG. 9, the apparatus further includes: a determination module 203, configured to determine that whether priority of the animation being performed is higher than priority of the animation corresponding to the interaction icon corresponding to the trigger operation or not, if the target virtual object model is performing an animation;

The control module 201 is configured to performing: if yes, performing the animation corresponding to the interaction icon corresponding to the trigger operation after the animation being performed is completed; and if not, suspending the animation being performed, performing the animation corresponding to the interaction icon corresponding to the trigger operation, and continuing to perform the animation being performed after the animation corresponding to the interaction icon corresponding to the trigger operation is completed.

As shown in FIG. 9, the apparatus further includes: a sending module 204 configured to send a display request to a server, where the display request includes: an identification of the interaction icon corresponding to the trigger operation, an identification of the first virtual object model, and an identification of the target virtual object model, and the display request is used to request the server to control a terminal of another visible virtual object model to display the animation corresponding to the interaction icon corresponding to the trigger operation, where another visible virtual object model includes another virtual object model with same state information as the first virtual object mode.

Optionally, the control module 201 is configured to perform displaying an interaction icon corresponding to the trigger operation issued by the first virtual object model in the second virtual scene, controlling the interaction icon to move to the target virtual object model along the preset path, and displaying the target virtual object model to receive the interaction icon according to a preset action.

Optionally, the display module 202 is configured to perform, if there is more than one interaction icon issued by different virtual object models to the target virtual object model, sequentially displaying the target virtual object model to receive the interaction icon according to the initiation time of the more than one interaction icon.

Optionally, the determination module 203 is configured to perform, in response to the trigger operation in the at least one interaction icon, determining that whether state information of the target virtual object model is same as state information of the first virtual object model or not; the state information is used to indicate survival state of a virtual object;

The control module 201 is configured to perform, if yes, controlling the first virtual object model to perform the animation corresponding to the interaction icon corresponding to the trigger operation to the target virtual object model.

Optionally, the display module 203 is configured to perform, in response to a selection operation for an icon of the target virtual object model in the at least one second virtual object model in the graphical user interface, displaying the at least one interaction icon corresponding to the target virtual object model within a preset range of the target virtual object model.

The above apparatus is used to implement the method provided by the aforementioned embodiment, their implementation principle and technical effect are similar, and details are not repeated here.

The above modules may be one or more integrated circuits configured to implement the above method, for example: one or more specific integrated circuits (Application Specific Integrated Circuit, referred to as ASIC), or one or more microprocessors (digital signal processor, referred to as DSP), or one or more field programmable gate arrays (referred to as FPGA), etc. For another example, when one of the above modules is implemented in the form of a processing element scheduling program code, the processing element may be a general-purpose processor, such as a central processing unit (referred to as CPU) or other processors that can call program codes. For another example, these modules can be integrated together and implemented in the form of a system-on-a-chip (referred to as SOC).

Figure 10:
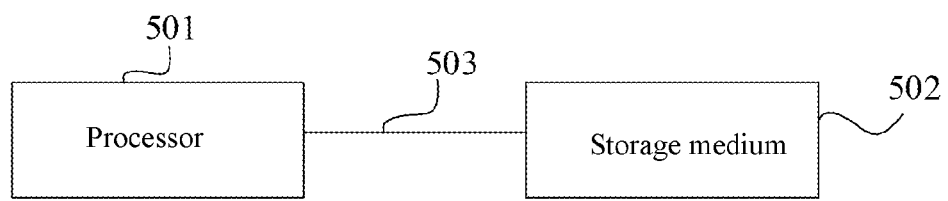
FIG. 10 is a schematic structural diagram of a device for interaction in a game provided by an embodiment of the present disclosure.

FIG. 10 is a schematic structural diagram of a device for interaction in a game provided by an embodiment of the present disclosure. The device for interaction in the game may be integrated into a terminal device or a chip of the terminal device.

The device for interaction in the game include: a processor 501, a storage medium 502 and a bus 503.

The processor 501 is used to store a program, and the processor 501 invokes the program stored in the storage medium 502 to perform the following method steps:
in the action stage, displaying a first virtual scene of the action stage by the graphical user interface; in response to a movement operation for a first virtual object, controlling the first virtual object to move in the first virtual scene of virtual environment, and controlling a range image of the first virtual scene of the virtual environment displayed in the graphical user interface to change correspondingly according to movement of the first virtual object;
in response to a preset trigger event, controlling the scene displayed by the graphical user interface to change from the first virtual scene to a second virtual scene in the discussion stage, where the second virtual scene includes a first virtual object model and at least one second virtual object model;
displaying at least one interaction icon by the graphical user interface;
in response to a trigger operation in the at least one interaction icon, controlling the first virtual object model to perform an animation corresponding to the interaction icon corresponding to the trigger operation to the target virtual object model, where the target virtual object model is a model in the at least one second virtual object model.

Optionally, the displaying at least one interaction icon by the graphical user interface includes:
in response to a selection operation for the at least one second virtual object model in the second virtual scene, determining the target virtual object model and displaying at least one interaction icon corresponding to the target virtual object model.

Optionally, in response to the trigger operation in the at least one interaction icon, controlling the first virtual object model to perform the animation corresponding to the interaction icon corresponding to the trigger operation to the target virtual object model includes:
in response to a trigger operation in the at least one interaction icon, performing the animation corresponding to the interaction icon corresponding to the trigger operation along a preset path between the first virtual object model and the target virtual object model.

Optionally, in response to the trigger operation in the at least one interaction icon, the controlling the first virtual object model to perform the animation corresponding to the interaction icon corresponding to the trigger operation to the target virtual object model includes:
taking the first virtual object model as a playback start position of the animation, taking the target virtual object model as a playback end position of the animation, and performing the animation corresponding to the interaction icon corresponding to the trigger operation along the preset path according to the playback start position and the playback end position.

Optionally, the performing the animation corresponding to the interaction icon corresponding to the trigger operation along the preset path between the first virtual object model and the target virtual object model includes:
if the target virtual object model is performing an animation, determining that whether priority of the animation being performed is higher than priority of the animation corresponding to the interaction icon corresponding to the trigger operation;

if so, performing the animation corresponding to the interaction icon corresponding to the trigger operation after the animation being performed is completed;

if not, suspending the animation being performed, performing the animation corresponding to the interaction icon corresponding to the trigger operation, and continuing to perform the animation being performed after the animation corresponding to the interaction icon corresponding to the trigger operation is completed.

Optionally, after responding to the trigger operation in the at least one interaction icon, the method further includes:

sending a display request to a server, where the display request includes: an identification of the interaction icon corresponding to the trigger operation, an identification of the first virtual object model, and an identification of the target virtual object model, and the display request is used to request the server to control a terminal of another visible virtual object model to display the animation corresponding to the interaction icon corresponding to the trigger operation, where the another visible virtual object model includes: another virtual object model with same state information as the first virtual object model.

Optionally, the performing the animation corresponding to the interaction icon corresponding to the trigger operation along the preset path between the first virtual object model and the target virtual object model includes:

displaying an interaction icon corresponding to the trigger operation issued by the first virtual object model in the second virtual scene, controlling the interaction icon to move to the target virtual object model along the preset path, and displaying the target virtual object model to receive the interaction icon according to a preset action.

Optionally, the displaying the target virtual object model to receive the interaction icon according to the preset action includes:

if there is more than one interaction icon issued by different virtual object models to the target virtual object model, sequentially displaying the target virtual object model to receive the interaction icon according to initiation time of the more than one interaction icon.

Optionally, in response to the trigger operation in the at least one interaction icon, the controlling the first virtual object model to perform the animation corresponding to the interaction icon corresponding to the trigger operation to the target virtual object model includes:

in response to the trigger operation in the at least one interaction icon, determining whether state information of the target virtual object model is same as state information of the first virtual object model; where, the state information is used to indicate survival state of a virtual object;

if yes, controlling the first virtual object model to perform the animation corresponding to the interaction icon corresponding to the trigger operation to the target virtual object model.

Optionally, in response to the selection operation for the at least one second virtual object model in the virtual scene, determining the target virtual object model, and displaying at least one interaction icon corresponding to the target virtual object model, includes:

in response to a selection operation for an icon of the target virtual object model in the at least one second virtual object model in the graphical user interface, displaying the at least one interaction icon corresponding to the target virtual object model within a preset range of the target virtual object model.

Embodiments of the present disclosure are similar to the specific implementation manners and technical effects of the above-mentioned method embodiments corresponding to FIGS. 1-7, and details are not repeated here.

Through the embodiments of the present disclosure, after the scene of the graphical user interface is controlled to change to the second virtual scene in response to a preset trigger event, at least one interaction icon can be displayed by the graphical user interface; and then in response to a trigger operation in at least one interaction icon, the first virtual object model is controlled to perform the animation corresponding to the interaction icon corresponding to the trigger operation to the target virtual object model, and the interaction between the first virtual object model and the target virtual object model is realized through the animation, thus realizing that in the second virtual scene, even if the first virtual object is not in the state of speaking, their attitude can be expressed at any time by the manner of selecting the interaction icon and the target virtual object model, or other players can be interacted with at any time, so that the problem that other players could not interact while one player was speaking is solved, improving the player's gaming experience.

Optionally, the present disclosure also provides a program product, such as a storage medium, on which a computer program is stored, including a program. When the program is executed by a processor, the following method steps are executed:

in the action stage, displaying a first virtual scene of the action stage by the graphical user interface; in response to a movement operation for a first virtual object, controlling the first virtual object to move in the first virtual scene of virtual environment, and controlling a range image of the first virtual scene of the virtual environment displayed in the graphical user interface to change correspondingly according to movement of the first virtual object;

in response to a preset trigger event, controlling the scene displayed by the graphical user interface to change from the first virtual scene to a second virtual scene in the discussion stage, where the second virtual scene includes a first virtual object model and at least one second virtual object model;

displaying at least one interaction icon by the graphical user interface;

in response to a trigger operation in the at least one interaction icon, controlling the first virtual object model to perform an animation corresponding to the interaction icon corresponding to the trigger operation to the target virtual object model, where the target virtual object model is a model in the at least one second virtual object model.

Optionally, the displaying at least one interaction icon by the graphical user interface includes:

in response to a selection operation for the at least one second virtual object model in the second virtual scene, determining the target virtual object model and displaying at least one interaction icon corresponding to the target virtual object model.

Optionally, in response to the trigger operation in the at least one interaction icon, the controlling the first virtual object model to perform the animation corresponding to the interaction icon corresponding to the trigger operation to the target virtual object model includes:

in response to a trigger operation in the at least one interaction icon, performing the animation corresponding to the interaction icon corresponding to the trigger operation along a preset path between the first virtual object model and the target virtual object model.

Optionally, in response to the trigger operation in the at least one interaction icon, the controlling the first virtual object model to perform the animation corresponding to the interaction icon corresponding to the trigger operation to the target virtual object model includes:

taking the first virtual object model as a playback start position of the animation, taking the target virtual object model as a playback end position of the animation, and performing the animation corresponding to the interaction icon corresponding to the trigger operation along the preset path according to the playback start position and the playback end position.

Optionally, the performing the animation corresponding to the interaction icon corresponding to the trigger operation along the preset path between the first virtual object model and the target virtual object model includes:

if the target virtual object model is performing an animation, determining that whether priority of the animation being performed is higher than priority of the animation corresponding to the interaction icon corresponding to the trigger operation;

if so, performing the animation corresponding to the interaction icon corresponding to the trigger operation after the animation being performed is completed;

if not, suspending the animation being performed, performing the animation corresponding to the interaction icon corresponding to the trigger operation, and continuing to perform the animation being performed after the animation corresponding to the interaction icon corresponding to the trigger operation is completed.

Optionally, after responding to the trigger operation in the at least one interaction icon, the method further includes:

sending a display request to a server, where the display request includes: an identification of the interaction icon corresponding to the trigger operation, an identification of the first virtual object model, and an identification of the target virtual object model, and the display request is used to request the server to control a terminal of another visible virtual object model to display the animation corresponding to the interaction icon corresponding to the trigger operation, where the another visible virtual object model includes: another virtual object model with same state information as the first virtual object model.

Optionally, the performing the animation corresponding to the interaction icon corresponding to the trigger operation along the preset path between the first virtual object model and the target virtual object model includes:

displaying an interaction icon corresponding to the trigger operation issued by the first virtual object model in the second virtual scene, controlling the interaction icon to move to the target virtual object model along the preset path, and displaying the target virtual object model to receive the interaction icon according to a preset action.

Optionally, the displaying the target virtual object model to receive the interaction icon according to the preset action includes:

if there is more than one interaction icon issued by different virtual object models to the target virtual object model, sequentially displaying the target virtual object model to receive the interaction icon according to initiation time of the more than one interaction icon.

Optionally, in response to the trigger operation in the at least one interaction icon, the controlling the first virtual object model to perform the animation corresponding to the interaction icon corresponding to the trigger operation to the target virtual object model includes:

in response to the trigger operation in the at least one interaction icon, determining whether state information of the target virtual object model is same as state information of the first virtual object model; where, the state information is used to indicate survival state of a virtual object;

if yes, controlling the first virtual object model to perform the animation corresponding to the interaction icon corresponding to the trigger operation to the target virtual object model.

Optionally, in response to the selection operation for the at least one second virtual object model in the virtual scene, the determining the target virtual object model, and displaying at least one interaction icon corresponding to the target virtual object model, includes:

in response to a selection operation for an icon of the target virtual object model in the at least one second virtual object model in the graphical user interface, displaying the at least one interaction icon corresponding to the target virtual object model within a preset range of the target virtual object model.

Embodiments of the present disclosure are similar to the specific implementation manners and technical effects of the above-mentioned method embodiments corresponding to FIGS. 1-7, and details are not repeated here.

Through the embodiments of the present disclosure, after the scene of the graphical user interface is controlled to change to the second virtual scene in response to a preset trigger event, at least one interaction icon can be displayed by the graphical user interface; and then in response to a trigger operation in at least one interaction icon, the first virtual object model is controlled to perform the animation corresponding to the interaction icon corresponding to the trigger operation to the target virtual object model, and the interaction between the first virtual object model and the target virtual object model is realized through the animation, thus realizing that in the second virtual scene, even if the first virtual object is not in the state of speaking, their attitude can be expressed at any time by the manner of selecting the interaction icon and the target virtual object model, or other players can be interacted with at any time, so that the problem that other players could not interact while one player was speaking is solved, improving the player's gaming experience.

In the several embodiments provided in the present disclosure, it should be understood that the disclosed apparatus and method may be implemented in other ways. For example, the apparatus embodiments described above are only illustrative. For example, the division of the units is only a logical function division. In actual implementation, there may be other division manners. For example, multiple units or components can be combined or may be integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual requirements to achieve the purpose of the solution of the embodiments.

In addition, each functional unit in each embodiment of the present disclosure may be integrated into one processing unit, each unit may exist separately physically, or two or more units may be integrated into one unit. The above-mentioned integrated units can be implemented in the form of hardware, or in the form of hardware plus software functional units.

The above-mentioned integrated units implemented in the form of software functional units may be stored in a computer-readable storage medium. The above-mentioned software functional units are stored in a storage medium, and include several instructions to enable a computer device (which may be a personal computer, server, or network device, etc.) or a processor to execute part of the steps of the method described in various embodiments of the present disclosure. The aforementioned storage medium includes various mediums that can store program code, such as: U disk, mobile hard disk, read-only memory (referred to as ROM), random access memory (referred to as RAM), magnetic disk or optical disc, etc.

What is claimed is:

1. A method for interaction in a game, wherein a graphical user interface is provided by a terminal, the graphical user interface comprises a virtual scene of a current round stage, the round stage comprises an action stage and a discussion stage, and the method comprises:
    displaying, in the action stage, a first virtual scene of the action stage by the graphical user interface; controlling, in response to a movement operation for a first virtual object, the first virtual object to move in the first virtual scene; and controlling a range image of the first virtual scene to change correspondingly according to movement of the first virtual object;
    controlling, in response to a preset trigger event, a scene displayed by the graphical user interface to change from the first virtual scene to a second virtual scene in the discussion stage, wherein the second virtual scene comprises a first virtual object model and at least one second virtual object model;
    displaying at least one interaction icon by the graphical user interface; and
    controlling, in response to a trigger operation in the at least one interaction icon, the first virtual object model to perform an animation corresponding to an interaction icon corresponding to the trigger operation to the target virtual object model, wherein the target virtual object model is a model in the at least one second virtual object model;
    wherein the displaying the at least one interaction icon by the graphical user interface comprises:
    determining, in response to a selection operation for the at least one second virtual object model, the target virtual object model, and displaying at least one interaction icon corresponding to the target virtual object model;
    wherein the controlling, in response to the trigger operation in the at least one interaction icon, the first virtual object model to perform the animation corresponding to the interaction icon corresponding to the trigger operation to the target virtual object model, comprises:
    in response to determining that state information of the target virtual object model is same as state information of the first virtual object model, controlling the first virtual object model to perform the animation corresponding to the interaction icon corresponding to the trigger operation to the target virtual object model, wherein, the state information is used to indicate survival state of a virtual object.

2. The method according to claim 1, wherein the controlling, in response to the trigger operation in the at least one interaction icon, the first virtual object model to perform the animation corresponding to the interaction icon corresponding to the trigger operation to the target virtual object model, comprises:
    performing the animation corresponding to the interaction icon corresponding to the trigger operation along a preset path between the first virtual object model and the target virtual object model.

3. The method according to claim 2, wherein the performing the animation corresponding to the interaction icon corresponding to the trigger operation along the preset path between the first virtual object model and the target virtual object model, comprises:
    performing the animation corresponding to the interaction icon corresponding to the trigger operation along the preset path according to a playback start position of the animation and a playback end position of the animation, wherein the first virtual object model is taken as the playback start position of the animation, and the target virtual object model is taken as the playback end position.

4. The method according to claim 2, wherein the performing the animation corresponding to the interaction icon corresponding to the trigger operation along the preset path between the first virtual object model and the target virtual object model comprises:
    in response to determining that priority of an animation being performed by the target virtual object model is higher than priority of the animation corresponding to the interaction icon corresponding to the trigger operation, performing the animation corresponding to the interaction icon corresponding to the trigger operation after the animation being performed by the target virtual object model is completed; and
    in response to determining that the priority of the animation being performed by the target virtual object model is not higher than the priority of the animation corresponding to the interaction icon corresponding to the trigger operation, suspending the animation being performed by the target virtual object model and performing the animation corresponding to the interaction icon corresponding to the trigger operation, and continuing to perform the animation being performed by the target virtual object model after the animation corresponding to the interaction icon corresponding to the trigger operation is completed.

5. The method according to claim 1, wherein the method further comprises:
    sending a display request to a server, wherein the display request comprises: an identification of the interaction icon corresponding to the trigger operation, an identification of the first virtual object model and an identification of the target virtual object model, and the display request is used to request the server to control a terminal of another visible virtual object model to display the animation corresponding to the interaction icon corresponding to the trigger operation, wherein the another visible virtual object model comprises another virtual object model with same state information as the first virtual object model.

6. The method according to claim 2, wherein the performing the animation corresponding to the interaction icon corresponding to the trigger operation along the preset path between the first virtual object model and the target virtual object model, comprises:

displaying an interaction icon corresponding to the trigger operation issued by the first virtual object model in the second virtual scene, controlling the interaction icon to move to the target virtual object model along the preset path, and displaying the target virtual object model to receive the interaction icon according to a preset action.

7. The method according to claim 6, wherein the displaying the target virtual object model to receive the interaction icon according to the preset action comprises:
in response to more than one interaction icon issued by different virtual object models to the target virtual object model, sequentially displaying the target virtual object model to receive the more than one interaction icon according to initiation time of the more than one interaction icon.

8. The method according to claim 1, wherein the determining, in response to the selection operation for the at least one second virtual object model, the target virtual object model, and displaying at least one interaction icon corresponding to the target virtual object model, comprises:
in response to a selection operation for an icon of the target virtual object model in the graphical user interface, displaying the at least one interaction icon corresponding to the target virtual object model within a preset range of the target virtual object model.

9. A device for interaction in a game, comprising a processor, a storage medium and a bus, wherein the storage medium stores with a machine-readable instruction executable by the processor, when the device for interaction in the game runs, the processor communicates with the storage medium through the bus, and the processor executes the machine-readable instruction to perform a method for interaction in a game, wherein a graphical user interface is provided by a terminal, the graphical user interface comprises a virtual scene of a current round stage, the round stage comprises an action stage and a discussion stage, and the method comprises:
displaying, in the action stage, a first virtual scene of the action stage by the graphical user interface; controlling, in response to a movement operation for a first virtual object, the first virtual object to move in the first virtual scene; and controlling a range image of the first virtual scene to change correspondingly according to movement of the first virtual object;
controlling, in response to a preset trigger event, a scene displayed by the graphical user interface to change from the first virtual scene to a second virtual scene in the discussion stage, wherein the second virtual scene comprises a first virtual object model and at least one second virtual object model;
displaying at least one interaction icon by the graphical user interface; and
controlling, in response to a trigger operation in the at least one interaction icon, the first virtual object model to perform an animation corresponding to an interaction icon corresponding to the trigger operation to the target virtual object model, wherein the target virtual object model is a model in the at least one second virtual object model;
wherein the displaying the at least one interaction icon by the graphical user interface comprises:
determining, in response to a selection operation for the at least one second virtual object model, the target virtual object model, and displaying at least one interaction icon corresponding to the target virtual object model;
wherein the controlling, in response to the trigger operation in the at least one interaction icon, the first virtual object model to perform the animation corresponding to the interaction icon corresponding to the trigger operation to the target virtual object model, comprises:
in response to determining that state information of the target virtual object model is same as state information of the first virtual object model, controlling the first virtual object model to perform the animation corresponding to the interaction icon corresponding to the trigger operation to the target virtual object model, wherein, the state information is used to indicate survival state of a virtual object.

10. A non-transitory computer-readable storage medium, storing with a computer program, wherein, when the computer program is run by a processor, a method for interaction in a game is performed, a graphical user interface is provided by a terminal, the graphical user interface comprises a virtual scene of a current round stage, the round stage comprises an action stage and a discussion stage, and the method comprises:
displaying, in the action stage, a first virtual scene of the action stage by the graphical user interface; controlling, in response to a movement operation for a first virtual object, the first virtual object to move in the first virtual scene; and controlling a range image of the first virtual scene to change correspondingly according to movement of the first virtual object;
controlling, in response to a preset trigger event, a scene displayed by the graphical user interface to change from the first virtual scene to a second virtual scene in the discussion stage, wherein the second virtual scene comprises a first virtual object model and at least one second virtual object model;
displaying at least one interaction icon by the graphical user interface; and
controlling, in response to a trigger operation in the at least one interaction icon, the first virtual object model to perform an animation corresponding to an interaction icon corresponding to the trigger operation to the target virtual object model, wherein the target virtual object model is a model in the at least one second virtual object model;
wherein the displaying the at least one interaction icon by the graphical user interface comprises:
determining, in response to a selection operation for the at least one second virtual object model, the target virtual object model, and displaying at least one interaction icon corresponding to the target virtual object model;
wherein the controlling, in response to the trigger operation in the at least one interaction icon, the first virtual object model to perform the animation corresponding to the interaction icon corresponding to the trigger operation to the target virtual object model, comprises:
in response to determining that state information of the target virtual object model is same as state information of the first virtual object model, controlling the first virtual object model to perform the animation corresponding to the interaction icon corresponding to the trigger operation to the target virtual object model, wherein, the state information is used to indicate survival state of a virtual object.

11. The method according to claim 1, wherein the first virtual object is a virtual object located in the first virtual scene and manipulated correspondingly by a player.

12. The method according to claim 1, wherein the trigger event comprises at least one of:
the discussion stage being initiated; or
the action stage ending.

13. The method according to claim 1, wherein a discussion display interface is displayed by the graphical user interface, and the discussion display interface is used to display current discussion progress.

14. The method according to claim 13, wherein, voting prompt information is displayed on top of the discussion display interface, and the voting prompt information is used to prompt remaining voting time in current voting link.

15. The method according to claim 1, wherein, the displaying the at least one interaction icon comprises:
   displaying the at least one interaction icon in form of a skill control.

16. The method according to claim 1, wherein, the displaying the at least one interaction icon comprises:
   displaying the at least one interaction icon in form of an abbreviated interaction icon.

17. The method according to claim 16, wherein, the displaying the at least one interaction icon further comprises:
   displaying, in response to a click operation for the abbreviated interaction icon, the at least one interaction icon of normal size.

18. The method according to claim 1, wherein the displaying the at least one interaction icon corresponding to the target virtual object model comprises:
   displaying the at least one interaction icon in a circle above the target virtual object model.

\* \* \* \* \*